United States Patent Office 3,105,794

Patented Oct. 1, 1963

3,105,794

SPIRAMYCIN D

Ernst Gaeumann and Vladimir Prelog, Zurich, Switzerland, assignors to Ciba Corporation, a corporation of Delaware No Drawing. Filed May 7, 1956, Ser. No. 582,910
Claims priority, application Switzerland May 10, 1955
9 Claims. (Cl. 167—65)

This invention provides four new crystalline antibiotics, which are referred to hereinafter as "spiramycin A," "spiramycin B," "spiramycin C," and "spiramycin D," and salts thereof, mixtures of the free compounds and the salts, hydrogenation and fission products of these antibiotics and pharmaceutical preparations which contain these compounds, and a process for the manufacture of these substances and mixtures of substances, The spiramycins are optically active bases which form colorless crystals. They are very closely related to one another but differ in their polarity. Their most important properties are shown in the following table.

| | Spiramycin | | | |
|---|---|---|---|---|
| | A | B | C | D |
| Melting point ........ degrees | 134–138 | 130–132 | 124–128 | 135–140 |
| [α]D in: | | | | |
| chloroform ........ do | −56 | −61 | −62 | ------- |
| methanol ........ do | −81 | −83 | −79 | −75 |
| UV absorption: λ maximum mμ | 231 | 231 | 231 | 231 |
| Analysis: | | | | |
| C ........ percent | 60.72 | 60.38 | 61.18 | 59.85 |
| H ........ do | 9.32 | 8.99 | 8.66 | 8.48 |
| N ........ do | 3.22 | 2.97 | 2.96 | 3.35 |
| $OCH_3$ ........ do | 3.78 | 3.69 | 3.62 | ------- |
| $(N)CH_3$ ........ do | 6.28 | 6.64 | 6.34 | ------- |
| $(C)CH_3$ ........ do | 8.18 | 8.48 | 8.96 | ------- |
| Active H | 0.68 | 0.54 | 0.46 | ------- |
| Equivalent weight: Titration | 458 | 467 | 478 | 452 |
| Empirical formula | $C_{45}H_{78}O_{15}N_2$ | $C_{47}H_{80}O_{16}N_2$ | $C_{48}H_{82}O_{16}N_2$ | ------- |
| Molecular weight | 887 | 929 | 943 | ------- |

In the infrared spectrum spiramycin A, B and C and D show bands at the following wave-lengths:

Spiramycin A (suspended in Nujol): at 2.88μ, 3.42μ, 3.51μ, 5.68μ, 5.76μ, 5.91μ, 6.15μ, 6.80μ, 7.24μ, 8.54μ, 8.89μ, 9.46μ, 9.80μ, 10.02μ, 10.97μ and 11.79μ.

Spiramycin A, in potassium bromide: at 2.86μ, 3.42μ, 3.60μ, 5.79μ, 5.82μ, 6.84μ, 7.05μ, 7.22μ, 7.55μ, 7.75μ, 8.02μ, 8.53μ, 8.85μ, 9.44μ, 9.78μ, 10.04μ, 10.98μ, 11.80μ, 12.32μ and 12.70μ.

Spiramycin B, in potassium bromide: at 2.86μ, 3.42μ, 3.63μ, 5.78μ, 6.85μ, 7.06μ, 7.24μ, 7.66μ, 7.82μ, 8.06μ, 8.54μ, 8.86μ, 9.44μ, 9.76μ, 9.98μ, 10.96μ, 11.58μ, 11.82μ, 12.28μ and 12.68μ.

Spiramycin C, in potassium bromide: at 2.88μ, 3.42μ, 5.77μ, 6.86μ, 7.24μ, 7.68μ, 7.82μ, 8.04μ, 8.59μ, 8.90μ, 10.02μ, 10.98μ, 11.56μ, 11.84μ, 12.30μ, and 12.74μ.

Spiramycin D, in potassium bromide: at 2.90μ, 3.45μ, 5.82μ, 6.10μ, 6.86μ, 7.08μ, 7.25μ, 7.32μ, 8.05μ, 8.66μ, 8.88μ, 9.46μ, 9.82μ 10.05μ, 11.05μ, 11.50μ, 11.82μ, 12.30μ, 12.72μ and 14.00μ.

By treating spiramycins A, B, C and D with a hydrogenating agent, the corresponding hydro compounds, such as for example the tetrahydro- and hexahydro-spiramycins, which have an antibiotic action, especially the tetrahydro-derivatives, can be obtained. Advantageously hydrogenation is carried out catalytically, for example using a palladium or a platinum catalyst.

If the spiramycins are subjected to hydrolysis, various fission products are obtained depending on the hydrolyzing agent used.

In the case of an acid hydrolysis, particularly under mild conditions, such as for example treatment with a dilute mineral acid, such as hydrochloric acid at room temperature, the spiramycins decompose into the following water soluble components:

(1) A neutral compound $C_7H_{14}O_4$ of melting point 126.5–127.5° C., which is identical with mycarose obtained when carbomycin is hydrolyzed (P. P. Regna et al., J. Amer, Chem. Soc. 75. 4625 (1953)).

(2) A dimethylamino-sugar which, when examined by paper chromatography, is distinctly different from desosamine which is obtained from erythromycin, picromycin or carbomycin.

On acid hydrolysis one obtains further lipophilic, crystalline fission products which will be called here "spiracidins," i.e. from spiramycin A spiracidin A, and from spiramycins B, C and D, spiracidins B, C and D. The spiracidins are optically active bases which can be easily distinguished from one another and from the corresponding spiramycins by paper chromatography. Their most important properties are shown in the following table.

| | Spiracidin | | | |
|---|---|---|---|---|
| | A | B | C | D |
| Melting point, °C | ---------------- | 227-231 | 217.5 | ------ |
| $[\alpha]_D$ in alcohol, degrees | ---------------- | −6 | −7 | ------ |
| UV-absorption: λ max., μ | 232 | 232 | 232 | 232 |
| Equivalent weight (titration) | ---------------- | 633 | 665 | ------ |
| Empirical formula | $C_{30}H_{53}O_{11}N$ | $C_{32}H_{55}O_{12}N$ | $C_{33}H_{57}O_{12}N$ | ------ |

In the infrared spectrum bands are exhibited inter alia at the following wave lengths:

Spiracidin B: at 3.93μ, 3.42μ, 5.78μ, 6.13μ, 6.86μ, 7.25μ, 7.65μ, 8.05μ, 8.51μ, 8.84μ, 9.16μ, 9.34μ 10.00μ, 10.58μ, 11.60μ and 12.73μ.

Spiracidin C: at 2.93μ, 3.42μ, 5.77μ, 6.13μ, 6.86μ, 7.24μ, 7.44μ, 7.63μ, 7.82μ, 8.10μ, 8.35μ, 8.54μ, 8.85μ, 9.22μ, 9.43μ, 9.93μ, 10.50μ, 11.24μ, 11.50μ, 11.90μ and 12.33μ.

In the case of alkaline hydrolysis of the spiramycins, for example when they are treated with dilute caustic soda solution, there is formed in addition to dimethylamine about 0.3 mol of formic acid. In the alkaline hydrolysis of spiramycin B 1 mol of acetic acid, and in the hydrolysis of spiramycin C 1 mol of propionic acid are also detected. Spiracidin B splits off 1 mol of acetic acid and spiracidin C 1 mol of propionic acid when subjected to alkaline hydrolysis.

The salts of the spiramycins, the tetrahydro- and hexahydrospiramycins and the spiracidins may be derived from known inorganic or organic acids, for example, hydrochloric acid, sulfuric acids, acetic acid, propionic acid, valeric acid, palmitic acid or oleic acid, citric acid, manelic acid, glutamic acid or pantothenic acid. They are neutral or acid salts. They are made by reacting the appropriate acid with the free base or by the double decomposition of salts, for example, from spiramycin sulfate and sodium pantothenate.

Spiramycins A, B, C and D have a high antibiotic action with respect to various test organisms in vitro. By using as test methods a series of dilutions (to the power of 10) in glucose broth, which are incubated for 24 hours at 37° C., the following concentrations causing inhibition were obtained:

| Test organism: | Inhibiting concentration, µg./ml. |
|---|---|
| *Streptococcus mitis* | 0.01 |
| *Streptococcus pyogenes* | 0.1 |
| *Streptococcus faecalis* | 1 |
| *Micrococcus pyogenes* var. *aureus* | 1 |
| *Micrococcus pyogenes* var. *aureus* (penicillin resistant) | 10 |
| *Corynebacterium diphtheriae* | 1 |
| *Bacillus megatherium* | 1 |

The spiramycins are also active at a concentration of 1 mg./cc. against the following micro-organisms:

*Escherichia coli, Salmonella typhosa, Klebsiella pneumoniae* (Type A), *Pasteurella pestis, Vibrio comma* (El Tor), *Salmonella schottmuelleri, Shigella sonnei, Pseudomonas aeruginosa, Mycobacterium tuberculosis* (H37Rv), *Candida tropicalis* and *Candida albicans* are not sensitive to 1 mg. spiramycin/cc.

In vivo the spiramycins are also highly active. When administered subcutaneously to mice infected with *Streptococcus pyogenes* 100 percent survival was obtained at 4 x 25 mg./kg. or 5 x 10 mg./kg. and 75 percent survival at 5 x 1 mg./kg., and when administered orally 100 percent survival was obtained with 9 x 50 mg./kg. and 75 percent survival with 9 x 25 mg./kg.

100% survival was also observed when mice which were infected with *Micrococcus pyrogenes* var. *aureus* or *Diplococcus pneumoniae*, Type III, were given 5 x 50 mg./kg. subcutaneously. A dose of 9 x 200 mg./kg. administered subcutaneously has the same effect in mice which are infected with *Pasteurella avicida.*

With subcutaneous administration of 20 mg/kg. or oral administration of 100 mg./kg. to mice infected with *Borrelia recurrentis,* 100 percent survival was obtained.

In the case of rats infected with amoebae the minimum effective dose is 50 mg./kg. given orally. Furthermore, the spiramycins readily influence *Pl. berghei* infection in mice.

The toxicity of the spiramycins is low: When injected once subcutaneously at 100 mg./kg., mice exhibited no symptoms of any injury. Higher doses have not yet been tried.

Penicillin-resistant micro-organisms are sensitive to the spiramycins. The spiramycins are partially cross-resistant with picromycin, that is to say, a strain of *Micrococcus pyogenes* var. *aureus* bred to be resistant to picromycin is not insensitive to the spiramycins, although it is distinctly less sensitive than its parent strain.

Also the tetrahydro- spiramycins have a high antibiotic action against various test organisms in vitro and in vivo. In the afore-described dilution test, made as described below, the still inhibiting concentrations shown in the table below were found. In this test, the antibiotic material is added aseptically in a series of concentrations (tenth powers) to glucose bouillon in test tubes. There is further added 0.2 cc. of an 18- to 24-hour-old culture of the test organism, and the whole is incubated for 24 hours at 37° C. The concentration shown in the table is that which just suffices to inhibit the growth of the test organism.

| Test organism: | Inhibiting concentration, µg./ml. |
|---|---|
| *Streptococcus mitis* | <1 |
| *Streptococcus pyogenes* | <1 |
| *Streptococcus faecalis* | <1 |
| *Micrococcus pyrogenes* var. *aureus* | 10 |
| *Micrococcus pyogenes* var. *aureus,* penicillin-resistant | 10 |
| *Corynebacterium diphtheriae* | <1 |
| *Bacillus megatherium* | <1 |

Like the spiramycins, the spiracidins A, B, C and D have a high antibiotic action against various test organisms in vitro and in vivo. When the in vitro test is made with the afore-described dilution series (tenth powers) in glucose bouillon incubated for 24 hours at 37° C. the following still inhibiting concentrations are ascertained, e.g. for spiracidin C.

| Test organism: | Inhibiting concentration, µg./ml. |
|---|---|
| *Streptococcus mitis* | 10 |
| *Streptococcus pyogenes* | 10 |
| *Streptococcus faecalis* | 100 |
| *Micrococcus pyogenes* var. *aureus* | 100 |
| *Micrococcus pyogenes* var. *aureus,* penicillin-resistant | 100 |
| *Corynebacterium diphtheriae* | 100 |
| *Bacillus megatherium* | 100 |

The new antibiotics are formed by the culture of a species of *Ambofaciens* of the genus Streptomyces. This species was isolated from soil samples collected at Rome in the Forum Romanum and in the Malcantone, Canton Tessin. The two organisms are not identical with any of the species referred to in Bergey's "Manual of Determinative Bacteriology," 6th Edition, or in "Actinomycetes and Their Antibiotics," by Waksman and Lechevalier, 1953. They are therefore described in detail herein and are designated as strains A8703 and A9427. They are kept in our laboratory and in the Eidg. Technischen Hochschule, Institut für spezielle Botanik, Zurich, under the above designations. Cultures of these strains have been deposited with the Northern Regional Research Branch of the U.S. Department of Agriculture and the depository has assigned the numbers NRRL 2531 and NRRL 2532 to species A8703 and A9427, respectively. They are both Streptomycetes having the conidial chains characteristic of this genus. Their spores are smooth and in almost all nutrient media they form a white-yellow to gold-yellow mycelial substratum; their air mycelial is velvety; initially white and later grey. Spirals are rare in A8703 but frequent in A9427.

For the purpose of further identification there is described below the growth of A8307 and A9427 on various nutrient media. The nutrient media Nos. 1–8 and also 12 were prepared according to W. Lindenbein, Arch. Mikrobiol., volume 17, page 361 (1952).

(1) Sythetic agar: Growth thin, cloud-like, initially grey-yellow, subsequently pale yellow-red and locally dark brown. The air mycelium is velvety, after 3 days grey-white, after 13 days in the case of A8703 ash grey with lighter spots, in the case of A9427 uniformly ash grey. No soluble pigment in the case of A8703, faintly reddish grey in A9427.

(2) Synthetic solution: Sediment and flocks, milk white; no pigment. In addition, in the case of A9427, a pellicle after 24 days with a white air mycelium.

(3) Glucose broth: Brown flocks and surface growth, pustular air mycelium is lead grey to ash grey. It forms no pigment.

(4) Glucose agar: Substratum mycelium is wrinkled, gold-yellow after three days and pale brown after seven days. It forms a pale brown pigment.

(5) Glucose-asparagin agar: Growth cloud-like, white-grey to greenish grey; the air mycelium is velvety, greenish grey after 3 days, after 7 days ash grey in the case of A8703 with a greenish tinge and with whitish spots, and in the case of A9427 uniformly leek-green. No pigment formation.

(6) Calcium malate agar: Substratum mycelium is thin, cloud-like, in A8703 white-yellow to grey, in A9427 reddish yellow to reddish grey; air mycelium is dusty, white-grey after 3 days, after 7 days in A8703 ash grey, in A9427 locally blue-green; substratum in the case of A8703 is not colored, in A9427 yellow-red.

(7) Gelatin stab at 18° C.: Surface growth, pellicle in A8703 brown to lead grey, in A9427 first white grey, then pink; the air mycelium is dusty, in A8703 chalk white, in A9427 white grey to ash grey; liquefaction is slow beginning after 16 days, in A8703 0.7–1 cm. after 36 days, in A9427 1–1.2 cm.; the substratum is hardly colored.

(8) Starch plate: Growth thin, in A8703 reddish grey, in A9427 brown; the air mycelium is velvety, in A8703 uniformly ash grey, in A9427 ash grey with white spots. Starch slightly hydrolyzed (0.3 cm. after 4 days).

(9) Nutrient agar (prepared from 10 grams of meat extract, 10 grams of peptone, 5 grams of NaCl, 17 grams of agar and 1 liter of water, pH value 7.2): Growth thin, smooth and pale yellow; no air mycelium after 13 days. Substratum not colored.

(10) Potato: Mycelial substratum is lichen-like, in A8703 pale yellow, in A9427 first deep yellow, after 10 days red-yellow; the air mycelium is first scanty then dusty lead grey. It forms no distinct pigment.

(11) Carrot: Growth thin, cloud-like and white-yellow; the air mycelium is velvety, first white-grey after 7 days in A8703 ash grey and in A9427 green-grey. No exopigment formation.

(12) Litmus milk (Difco No. B 107) Surface growth having an ash grey air mycelium; coagulation and peptonization distinct after seven days, litmus in the A8703 faintly red, in the case of A9427 blue.

The strains A8703 and A9427 in some ways resemble *Streptomyces griseoluteus* of Umezawa and co-workers, but grow well on gelatine. They also resemble *Streptomyces griseolus* (Waksman) Waksman and Henrici, but their air mycelium is not initially grey and they exhibit different reactions on milk *Streptomyces flavogriseus* (Duché) of Waksman and Lechevalier is distinguished from the new strains especially by its behaviour on nutrient agar and milk, and *Streptomyces bikiniensis* of Johnstone and Waksman forms no dark brown pigment.

Strains A8703 and A9427, when tested by the method of T. G. Pridham and D. Gottlieb, Journal of Bacteriology, volume 56, page 107 (1948), grow on various sources of carbon as follows:

| | A8703 | A9427 | | A8703 | A9427 |
|---|---|---|---|---|---|
| L-Xylose | + | + | D-Mannitol | + | + |
| L-Arabinose | + | + | D-Sorbitol | (−) | − |
| L-Rhamnose | + | + | Dulcitol | − | − |
| D-Fructose | + | + | Mesoinositol | (+) | + |
| D-Galactose | + | + | Salicin | + | + |
| Saccharose | − | (−) | Sodium acetate | (−) | (+) |
| Maltose | + | + | Sodium citrate | (−) | (+) |
| Lactose | + | + | Sodium succinate | (−) | (+) |
| Raffinose | − | − | Glycerine | + | + |
| Inulin | + | + | Glucose | + | + |

The symbols have the following meanings:
+ Good growth, and the carbon source consumed with certainty.
(+) Weak growth, consumption of the carbon source being questionable.
(−) Growth very weak, and consumption of the carbon source improbable.
− No growth, and no consumption of the carbon source.

The present invention, insofar as it includes the preparation of the spiramycins, is not limited to the use of the Streptomycetes described above or another strain corresponding with the description, but also includes the use of variants of these organisms such, for example, as those obtained by selection or mutation, especially under the action of ultraviolet rays or X-rays or nitrogen-mustard oils.

For the preparation of the spiramycin a strain of Streptomycetes having the properties of strain A8703 or A9427 is aerobically incubated, for example, in a nutrient solution containing aqueous inorganic salts, nitrogen containing compounds and, if desired, carbohydrates, until the strain exhibits a substantial anti-bacterial action, and the spiramycin is then isolated from the culture filtrate.

The nutrient solution contains as inorganic salts, for example, chlorides, nitrates, carbonates or sulfates of alkali metals, alkaline earth metals, magnesium, iron, zinc or manganese. As nitrogen-containing compounds, and, if desired, carbohydrates and growth-promoting substances there may be mentioned, for example, amino acids and mixtures thereof, peptides and proteins and also hydrolysates thereof such as peptone or tryptone, meat extracts, water-soluble constituents of cereal grains, such as maize and wheat, or of distillation residues from the manufcacture of alcohol, or of yeast, beans, especially of the soya plant, or of seeds, for example of the cotton plant, and also glucose, saccharose, lactose, starches and the like.

The incubation is carried out aerobically, for example, in a quiescent surface culture or advantageously in a submerged culture with agitation or stirring in the presence of air or oxygen in a shaking flask or the known fermenters preferably at a pH range of 6 to 8. Suitable temperatures are between 22° C. and 32° C. Generally the nutrient solution exhibits a substantial anti-bacterial action after 1½ to 5 days.

In order to isolate the antibiotics from the culture filtrate freed from mycelium the following methods may be used: The culture filtrate is extracted, advantageously at a pH value above 7.0, with an organic solvent immiscible with water, such as an ester of a lower fatty acid, for example, ethyl acetate or amyl acetate, or a chlorinated hydrocarbon, for example, ethylene chloride, methylene chloride or chloroform, or a ketone, for example, methyl propyl ketone, methyl amyl ketone or diisobutyl ketone, or an alcohol such as a butyl alcohol or an amyl alcohol, or ethers, for example, ethyl ether, diisopropyl ether, a dibutyl ether or a glycol ether or the like. Instead of extracting the culture filtrate with a solvent, or in addition to such an extraction and serving as a further purification operation, the antibiotics may be obtained by adsorption, for example, on active carbon or on activated earth, such as fuller's earth or Floridin, followed by extraction of the adsorbate, for example, with an acid aqueous solution and/or with an organic solvent which is at least partially soluble in water, such as isopropanol, butanol or methyl ethyl ketone.

A good method of separating and purifying the new antibiotics consists in distributing them between an acid aqueous solution, for example, an 0.2-molar citrate buffer, and an organic solvent immiscible with water, example chloroform or methylene chloride. The distribution is advantageously carried out by the counter current method in an apparatus suitable for that method. Chromatography is also very suitable for purification. The pure antibiotics can be obtained in crystalline form, for example, from an organic solvent such as a mixture of ether and petroleum ether, a mixture of benzene and petroleum ether or a mixture of acetone and petroleum ether. For the purpose of recrystallization these solvents may be used or aqueous organic solutions, such as dilute alcohols, dilute acetone etc.

The invention includes, in addition to the production of the crystalline spiramycins, the production of their neutral and acid salts with inorganic or organic acids their hydrogenation and fission products, and also includes the said compounds themselves, especially spiramycin sulfates and spiramycin hydrochlorides, acetates and pantothenates.

The spiramycins, their hydrogenation products, the spiracidins, their salts and corresponding mixtures can be used as medicaments, for example, in the form of pharmaceutical preparations. The preparations contain the active compound in admixture with a pharmaceutical organic or inorganic carrier suitable for enteral, parenteral or local administration. For preparing the carrier there may be used substances which do not react with the new compounds, for example, gelatine, lactose, starches, magnesium stearate, talc, vegetable oils, benzyl alcohols, gums, polyalkylene glycols, Vaseline, cholesterol and other known carriers for medicaments. The pharmaceutical preparations may be made up, for example, as tablets, dragees, powders, salves, creams, suppositories or in liquid form as solutions, suspensions or emulsions. If desired, they may be sterilized and/or contain auxiliary substances, such as preserving, stabilizing, wetting or emulsifying agents. They may also contain other therapeutically valuable substances.

*Example 1*

A nutrient solution having the following composition is prepared: 10 grams of crude glucose, 10 grams of the commercial product known as "Distillers' solubles," 5 grams of sodium chloride, 1 gram of sodium nitrate, 10 grams of calcium carbonate and 1 litre of tap water, and adjusted to a pH value of 7.8. This quantity of solution or a multiple thereof is charged into Erlenmeyer flasks of 500 cc. capacity (100 cc. of nutrient solution in each flask) or into fermenters of 500 liters' capacity (each containing 300 liters of nutrient solution), and the solutions are sterilized for 20–30 minutes under one atmosphere gauge pressure. The solutions are then inoculated with up to 10 percent of a partially sporulating vegetative culture of strain A8703 and incubated, while agitating or stirring well, and, in the case of the fermenters with aeration (with about 1 part by volume of sterile air per volume of nutrient solution per minute) at 27° C. After 48 hours' growth, the cultures are filtered, with the addition of a filter aid, through a filter press or a rotating filter and so as to free the aqueous solution containing the antibiotic from mycelium and other solid constituents.

Every 150 liters of culture filtrate are extracted at a pH value of 8.5 with 90 liters of ethyl acetate in a Westphalia extractor. The extract is concentrated in a thin layer-evaporator to about 2 liters, and the residue is extracted with agitation 8 times with 100 cc. of an 0.5 N-aqueous acetic acid on each occasion, the whole of the active material passing into the aqueous phase. The acetic acid extract is rendered alkaline with a concentrated solution of sodium carbonate and extracted five times by agitation with 100 cc. of ethyl acetate on each occasion. The ethyl acetate solution is washed, dried with sodium sulfate and evaporated to dryness in vacuo at 40° C. 1.48 grams of a yellowish amorphous product remain behind.

1.18 grams of this material are distributed by the method of Craig through 90 stages in a solvent system consisting of chloroform and an 0.2-molar citrate buffer (pH value 5.0). Three activity maxima are formed in stages 0, 28 and 66. The fractions 58–75 having the main activity are united, rendered alkaline with sodium carbonate and extracted several times with chloroform. The organic extract is washed with a small amount of water and evaporated. There are obtained 330 milligrams of crude spiramycin A in the form of a viscous yellow oil.

This product is again distributed in the same solution system through 52 stages, during which it is found to be to a great extent uniform. The working up of the active fractions is carried out in three portions, fractions 33–39 (65 milligrams), fractions 40–44 (120 milligrams) and fractions 45–52 (46 milligrams). Fraction 40–44 crystallize from a mixture of ether and petroleum ether. By inoculating fractions 33–39 and 45–52 with this material they also crystallize. A total of 164 milligrams of crystals are obtained. Recrystallization is carried out from a mixture of benzene and petroleum ether.

The spiramycin A so obtained is in the form of colorless crystals melting at 134–138° C. Elementary analysis (after drying the material for 10 hours at 80° C. in a high vacuum) gave the following values:

| $C_{45}H_{78}O_{15}N_2$ | Calculated, percent | Found, percent |
|---|---|---|
| C | 60.93 | 60.72 |
| H | 8.86 | 9.32 |
| N | 3.16 | 3.22 |
| 1 $OCH_3$ | 3.50 | 3.78 |
| 4 (N) $CH_3$ | 6.78 | 6.28 |
| 5 (C) $CH_3$ | 8.48 | 8.18 |
| 6 active H | 0.68 | 0.68 |

$[\alpha]_D = -56°$ (in chloroform) and $-81°$ (in methanol). Ultraviolet absorption: $\lambda$ maximum 231 m$\mu$, log $\epsilon = 4.45$. In the infrared spectrum, (suspension in Nujol) bands are exhibited, inter alia, at the wave lengths 2.88$\mu$, 3.42$\mu$, 3.51$\mu$, 5.68$\mu$, 5.76$\mu$, 5.91$\mu$, 6.15$\mu$, 6.80$\mu$, 7.24$\mu$, 8.54$\mu$, 8.89$\mu$, 9.46$\mu$, 9.80$\mu$, 10.02$\mu$, 10.97$\mu$ and 11.79$\mu$, and in potassium bromide inter alia at 2.86$\mu$, 3.42$\mu$, 3.60$\mu$, 5.79$\mu$, 5.82$\mu$, 6.34$\mu$, 7.05$\mu$, 7.22$\mu$, 7.55$\mu$, 7.75$\mu$, 8.02$\mu$, 8.53$\mu$, 8.85$\mu$, 9.44$\mu$, 9.78$\mu$, 10.04$\mu$, 10.98$\mu$, 11.80$\mu$, 12.32$\mu$ and 12.70$\mu$.

Dissolved in a mixture of methyl-Cellosolve (2-methoxyethanol) and water (80:20) spiramycin A has a pK value of 6.8, equivalent weight 458.

On catalytic hydrogenation, calculated on the molecular weight 887, 2 mols of hydrogen are taken up with a palladium catalyst in ethanol and 3 mols of hydrogen are taken up with a platinum catalyst in glacial acetic acid.

The fractions 24–32 of the first countercurrent distribution containing the second activity maximum are rendered alkaline with sodium carbonate and extracted several times with chloroform. The organic extract is washed with a little water and evaporated. 200 mg. of crude spiramycin B are obtained as oil.

This product is again distributed through 120 stages in a solvent system consisting of chloroform and a 1-mol acetate buffer (pH value 4.6). The activity maximum is now in stage 66. The fractions 64–68 are rendered alkaline and extracted with chloroform. 80 mg. of spiramycin B are obtained which crystallize from a mixture of ether and petroleum ether. Melting point=130–132° C., optical rotation $[\alpha]_D = 61°$ (in chloroform) and $-83°$ (in methanol). Elementary analysis gave the following values:

| $C_{47}H_{80}O_{16}N$ | Calculated, percent | Found, percent |
|---|---|---|
| C | 60.75 | 60.38 |
| H | 8.88 | 8.99 |
| N | 3.02 | 2.97 |
| 1 $OCH_3$ | 3.34 | 3.69 |
| 4 (N) $CH_3$ | 6.77 | 6.64 |
| 6 (C) $CH_3$ | 9.71 | 8.48 |
| 5 active H | 0.54 | 0.54 |

Ultraviolet spectrum: λ max. 231 mμ, log ε=4.43. In the infrared spectrum (suspension in potassium bromide) bands are exhibited, inter alia, at the wave lengths 2.86μ, 3.42μ, 3.63μ, 5.78μ, 6.85μ, 7.06μ, 7.24μ, 7.66μ, 7.82μ, 8.06μ, 8.54μ, 8.86μ, 9.44μ, 9.76μ, 9.98μ, 10.96μ, 11.58μ, 11.82μ, 12.28μ and 12.68μ.

Dissolved in a mixture of methyl-Cellosolve and water (80:20) spiramycin B has a pK value of 6.82, equivalent weight 467. On hydrogenation in ethanol with a palladium catalyst, 2 mols of hydrogen are taken up calculated on the molecular weight 929, with a platinum catalyst in glacial acetic acid 3 mols of hydrogen are taken up.

The fractions 0–20 of the first counter-current distribution containing the third activity maximum are combined and worked up as described above, 450 mg. of a viscous oil being obtained. This is distributed again through 290 stages in a solvent system consisting of chloroform and a molar acetate buffer (pH value 4.5). There are now two activity maxima in stage 135 (spiramycin C) and in stage 73 (spiramycin D) respectively.

The fractions 130–140 are combined and worked up as described above. 150 mg. of spiramycin C are obtained which are crystallized from a mixture of ether and petroleum ether. Melting point=124–128° C., optical rotation $[\alpha]_D=-62°$ (in chloroform) and −79° (in methanol). Elementary analysis gave the following values:

| $C_{48}H_{82}O_{16}N_2$ | Calculated, percent | Found, percent |
|---|---|---|
| C | 61.12 | 61.18 |
| H | 8.76 | 8.66 |
| N | 2.97 | 2.96 |
| 1 $OCH_3$ | 3.29 | 3.62 |
| 4 (N) $CH_3$ | 6.38 | 6.34 |
| 6 (C) $CH_3$ | 9.56 | 8.96 |
| 5 active H | 0.53 | 0.46 |

Ultraviolet spectrum: λ max. 231 mμ, log ε=4.45. In the infrared spectrum (suspension in potassium bromide) bands are exhibited, inter alia, at the wave lengths 2.88μ, 3.42μ, 5.77μ, 6.86μ, 7.24μ, 7.68μ, 7.82μ, 8.04μ, 8.59μ, 8.90μ, 10.02μ, 10.98μ, 11.56μ, 11.84μ, 12.30μ and 12.74μ.

Dissolved in a mixture of methyl-cellosolve and water (80:20) spiramycin C has a pK value of 6.8, equivalent weight 478. On hydrogenation, spiramycin C takes up 2 mols of hydrogen, calculated on the molecular weight 943, in ethanol with a palladium catalyst, and in glacial acetic acid with a platinum catalyst 3 mols of hydrogen.

Spiramycin D is obtained by working up the fractions 70–76 of the above described countercurrent distribution in the form of colorless, microcrystalline powder.

Melting point=135–140° C., optical rotation $[\alpha]_D=-75°$ (c.=0.81 in alcohol). Elementary analysis gave the following values: C=59.85, H=8.48, N=3.35%. Ultraviolet spectrum: λ max. 231 mμ, log ε=4.44. In the infrared spectrum (suspension in potassium bromide) bands are exhibited, inter alia, at the wave lengths 2.90μ, 3.45μ, 5.82μ, 6.10μ, 6.86μ, 7.08μ, 7.25μ, 7.32μ, 8.05μ, 8.66μ, 8.88μ, 9.46μ, 9.82μ, 10.05μ, 11.05μ, 11.50μ, 11.82μ, 12.30μ, 12.72μ and 14.00μ.

Dissolved in a mixture of methyl-Cellosolve and water (80:20), spiramycin D has a pK value of 6.8, equivalent weight 452. On hydrogenation in ethanol with a palladium catalyst 2 mols of hydrogen are taken up.

The spiramycins give the same coloration with concentrated hydrochloric acid as is described by Fischbach and Levine (Antibiotics and Chemotherapy 3, 1159 (1953)) for erythromycin. The color reaction on carbomycin described by the same authors is similar in the case of the spiramycins, the tints being somewhat less intensive and pure.

*Example 2*

A sterile nutrient solution having the composition indicated in Example 1 is inoculated with up to 10% of a partially sporulating vegetative culture of strain A9427 and incubated as described in Example 1. After 48 hours the culture exhibits antibiotic activity. The culture is filtered and extracted according to the data given in Example 1, and the crude extract is purified by means of counter-current distribution and separated. In this manner there are obtained spiramycin A with melting point 134–138° C., spiramycin B with melting point 130–132° C., spiramycin C with melting point 124–128° C. and spiramycin D with melting point 135–140° C.

*Example 3*

1 part by weight of spiramycin (A, B, C or D) is allowed to stand at room temperature with 50 parts by volume of 0.75 N-hydrochloric acid. After 24 hours the solution is neutralized with a slight excess of sodium hydrogen carbonate and extracted three times with chloroform.

The aqueous phase is evaporated to dryness at 30° C. under reduced pressure, and the residue is extracted three times with hot benzene. The benzene solutions are filtered and evaporated under reduced pressure. Examination of the residue by paper chromatograph (System: butanol-glacial acetic acid 10:1 saturated with water) shows the presence of two substances which reduce silver diammine. The first of these substances travels in the chromatogram 1.7 times as quickly as desosamin obtained by hydrolyzing carbomycin, whilst the second substance behaves like mycarose obtained by hydrolyzing carbomycin.

The residue of the benzene extracts is dissolved in a little acetone, the mycarose being obtained in crystalline form. Melting point=126.5–127.5° C., mixed melting point with authentic substance is the same.

The chloroform extracts of the original hydrolyzation mixture are dried and evaporated. From the residue, the spiracidins are obtained in pure form by crystallization from ether or from a mixture of acetone and ether. Spiracidin A is obtained by acid hydrolysis of spiramycin A, the spiracidins B, C and D by acid hydrolysis of spiramycin B, C and D.

Spiracidin A: Ultraviolet spectrum: λ max. 232mμ.

Spiracidin B: melting point=227–231° C., $[\alpha]_D=-6°$ (alcohol). Elementary analysis gave the following values: C 59.50, H 8.70, N 2.22, $OCH_3$ 5.03, (N)$CH_3$ 4.03, (C)$CH_3$ 9.61, active H 0.70%. Ultraviolet absorption spectrum: λ max. 232 mμ, log ε=4.41. In the infrared spectrum (suspension in potassium bromide) bands are exhibited, inter alia, at the wave lengths 2.93μ, 3.42μ, 5.78μ, 6.13μ, 6.86μ, 7.25μ, 7.65μ, 8.05μ, 8.51μ, 8.84μ, 9.16μ, 9.34μ, 10.00μ, 10.58μ, 11.60μ and 12.73μ.

Dissolved in a mixture of methyl-Cellosolve and water (80:20) spiracidine B has a pK value of 7.5, equivalent weight 633. On catalytic hydrogenation with a palladium catalyst 2 mols of hydrogen are taken up.

Spiracidin C: melting point=217.5° C., $[\alpha]_D=-7°$ (alcohol). Elementary analysis gives the following values: C 60.40, H 8.68, N 2.25, $OCH_3$ 5.12, $(N)CH_3$ 4.52, $(C)CH_3$ 9.61, active H 0.73%. Ultraviolet absorption spectrum: λ max. 232mμ, log ε=4.41. In the infrared spectrum (suspension in potassium bromide) bands are exhibited, inter alia, at the wave lengths 2.93μ, 3.42μ, 5.77μ, 6.13μ, 6.86μ, 7.24μ, 7.44μ, 7.63μ, 7.82μ, 8.10μ, 8.35μ, 8.54μ, 8.85μ, 9.22μ, 9.43μ, 10.50μ, 11.24μ, 11.50μ, 11.90μ and 12.33μ.

Dissolved in a mixture of methyl-Cellosolve and water (80:20) spiracidin C has a pK value of 7.6, equivalent weight 665. On catalytic hydrogenation with a palladium catalyst 2 mols of hydrogen are taken up.

Spiracidin D: Ultraviolet spectrum: λ max. 232mμ.

*Example 4*

310 mg. of spiramycin B are boiled under reflux with 450 mg. of potassium hydroxide in 15 cc. of water and 15 cc. of methanol for one hour, dimethylamine being liberated. The methanol is then removed by evaporation under reduced pressure. To the remaining solution there is added enough phosphoric acid to render the solution just acid to Congo red, the latter is distilled at 70° C. bath temperature under 80 mm. pressure of mercury. The distillate with an acid reaction is titrated with 0.1 N-caustic soda solution against phenolphthalein, the consumed quantity of solution calculated on the spiramycin corresponds to 1.3 mols of acids. The neutral solution is evaporated to dryness under reduced pressure. In the residue there can be detected by paper chromatography according to the method of Jones (Annal. Chem. 25, 394 (1953)) in addition to a little formic acid only acetic acid. The residue is reacted with para-phenyl-phenacyl bromide, whereby para-phenyl-phenacyl acetate of melting point 110.5–111.5° C. is obtained.

In the corresponding hydrolysis of spiramycin A and C, 0.4 mol and 1.3 mols of acids are obtained respectively which in the case of spiramycin A consist only of formic acid, whilst in the case of spiramycin C besides a little formic acid much propionic acid is obtained. The latter is converted by reaction with para-phenyl-phenacyl bromide into para-phenyl-phenacyl propionate of melting point 101.5–102° C.

In an analogous hydrolysis of spiracidins B and C 1.1 mols of acetic acid and 1.0 mol of propionic acid are obtained respectively.

*Example 5*

To a solution of 50 mg. of spiramycin A in 5 cc. of ethanol are added 50 mg. of a palladium-calcium carbonate catalyst, and the mixture is agitated for one hour in an atmosphere of hydrogen. The hydrogen taken up corresponds to a quantity of 2 mols calculated on the spiramycin used as starting material. The solution is then filtered and the filtrate evaporated to dryness under reduced pressure. Tetrahydro-spiramycin A is obtained as a colorless powder. It has an antibiotic activity.

When spiramycin B, C and D are hydrogenated in the same manner, tetrahydro-spiramycin B, tetrahydro-spiramycin C and tetrahydro-spiramycin D are obtained respectively. These substances have an antibiotic effect. From spiracidins A, B, C and D there are obtained in an analogous manner tetrahydro-spiracidin A, tetrahydro-spiracidin B, tetrahydro-spiracidin C and tetrahydro-spiracidin D respectively.

*Example 6*

To a solution of 50 mg. of spiramycin A in 5 cc. of glacial acetic acid are added 50 mg. of a platinum catalyst, and the mixture is agitated for one hour in an atmosphere of hydrogen. The hydrogen taken up corresponds to a quantity of 3 mols calculated on the spiramycin used as starting material. The solution is filtered, the filtrate is evaporated to dryness in vacuo at 45° C. after the addition of a little water. Hexahydro-spiramycin A is obtained as a colorless powder.

When spiramycins B, C and D are hydrogenated in the same manner there are obtained hexahydro-spiramycin B, hexahydro-spiramycin C and hexahydro-spiramycin D respectively. From spiracidins A, B, C and D there are obtained in an analogous manner hexahydro-spiracidin A, hexahydro-spiracidin B, hexahydro-spiracidin C and hexahydro-spiracidin D respectively.

What is claimed is:

1. A method for preparing spiramycin D in pure form which comprises incubating a strain of *Streptomyces ambofaciens* selected from the group consisting of strains NRRL 2531 and NRRL 2532, until the nutrient solution exhibits a substantial antibacterial activity, extracting the culture filtrate at a pH of about 8.5 with ethyl acetate, evaporating the organic solvent and subjecting the resulting amorphous product to countercurrent distribution through 90 stages between chloroform and an aqueous buffer of pH 5.0, combining the fractions 0–20 and working them up to yield an oil which is distributed through 290 stages between chloroform and an aqueous buffer of pH of 4.5, working up the fractions 70–76 and isolating the microcrystalline antibiotic therefrom.

2. A method as claimed in claim 1, wherein the antibiotics are prepared in the form of crystalline salts with a member of the group consisting of inorganic and organic acids by reacting these acids with the antibiotics.

3. A member of the group consisting of the new antibiotic spiramycin D, melting at 135–140° C. and having the optical rotation $[\alpha]_D=-75°$ (c.=0.81, in methanol), a pK-value of 6.8 (in 2-methoxyethanol/water 80:20), giving the following values in elementary analysis: C=59.85%, H=8.48%, N=3.35% and O=28.32%, having an equivalent weight of 452, exhibiting in the UV-spectrum one band at 231 mμ (log E=4.44) and, suspended in potassium bromide, showing in the IR-spectrum, inter alia, bands at 2.90μ, 3.45μ, 5.82μ, 6.10μ, 6.86μ, 7.08μ, 7.25μ, 7.32μ, 8.05μ, 8.66μ, 8.88μ, 9.46μ, 9.82μ, 10.05μ, 11.05μ, 11.50μ, 11.82μ, 12.30μ, 12.72μ, and 14.00μ, yielding on hydrogenation a tetrahydro- and hexahydro product and on acid hydrolysis, besides a neutral compound $C_7H_{14}O_4$ identical with mycarose and a dimethylamino sugar, a lipophilic crystalline base, spiracidin D, which shows in the UV-spectrum one band at 232μ, and salts thereof, said spiramycin D having been prepared by the process of claim 1.

4. An acid addition salt of the product of claim 3 with a member of the group consisting of inorganic and organic acids.

5. A sulfate of the product of claim 3.

6. A hydrochloride of the product of claim 3.

7. An acetate of the product of claim 3.

8. A pantothenate of the product of claim 3.

9. Pharmaceutical preparations consisting essentially of a member of the group consisting of spiramycin D and its salts, and a pharmaceutical adjuvant as a carrier, said spiramycin D having been prepared by the process of claim 1.

References Cited in the file of this patent

UNITED STATES PATENTS

| | | |
|---|---|---|
| 2,617,755 | Benedict et al. | Nov. 11, 1952 |
| 2,653,899 | Bunch et al. | Sept. 29, 1953 |

(Other references on following page)

UNITED STATES PATENTS

| | | |
|---|---|---|
| 2,691,618 | Tanner et al. | Oct. 12, 1954 |
| 2,953,023 | Ninet et al. | June 28, 1960 |
| 2,943,024 | Ninet et al. | June 28, 1960 |
| 2,943,025 | Ninet et al. | June 28, 1960 |
| 2,978,380 | Preud'homme et al. | Apr. 4, 1961 |
| 3,000,785 | Ninet et al. | Sept. 19, 1961 |
| 3,011,947 | Preud'homme et al. | Dec. 5, 1961 |

FOREIGN PATENTS

| | | |
|---|---|---|
| 758,726 | Great Britain | Oct. 10, 1956 |

OTHER REFERENCES

Waksman et al.; Actinomycetes and Their Antibiotics, 1953, Williams and Wilkins, Baltimore, Maryland, pp. 52–59, 63, and 64.

Flynn: Journal Amer. Chem. Soc., pp. 3121–3131, June 20, 1954.

Hochstein: Journal Amer. Chem. Soc., pp. 5080–5083, October 20, 1954.

Antibiotics Annual, 1954–1955, pub. February 1955 by Med. Encycl. Inc., pp. 724–725.

Corbaz et al.: Helvetica Chimica Acta, 1956, pp. 304–316.

UNITED STATES PATENT OFFICE
CERTIFICATE OF CORRECTION

Patent No. 3,105,794 October 1, 1963

Ernst Gaeumann et al.

It is hereby certified that error appears in the above numbered patent requiring correction and that the said Letters Patent should read as corrected below.

Column 12, line 53, for "232μ" read -- 232 mμ --.

Signed and sealed this 5th day of May 1964.

(SEAL)
Attest:
ERNEST W. SWIDER

Attesting Officer

EDWARD J. BRENNER
Commissioner of Patents